United States Patent

[11] 3,601,893

| [72] | Inventor | Lyle N. Knox<br>832 Lausanne Ave., Daly City, Calif. 94014 |
|---|---|---|
| [21] | Appl. No. | 796,758 |
| [22] | Filed | Feb. 5, 1969 |
| [45] | Patented | Aug. 31, 1971 |

[54] CUTTING TOOL FOR SHEET MATERIAL
3 Claims, 5 Drawing Figs.

[52] U.S. Cl. ................................................ 30/164.9,
30/366, 30/155
[51] Int. Cl. .................................................... B26b 3/00,
B26f 1/00, B26b 3/06
[50] Field of Search ................................................ 30/151,
152, 153, 155, 156, 157, 158, 159, 160, 161,
164.9, 164.95, 165; 7/14.3; 30/337, 339

[56] References Cited
UNITED STATES PATENTS

| 464,681 | 12/1891 | Tollefson | 30/160 |
|---|---|---|---|
| 1,449,618 | 3/1923 | Malby | 30/155 |
| 2,154,211 | 4/1939 | Madsen | 30/156 |
| 2,847,758 | 8/1958 | Kozan | 30/164.9 |
| 1,855,975 | 4/1932 | Lamb | 7/14.3 |

Primary Examiner—Othell M. Simpson
Assistant Examiner—Gary L. Smith
Attorney—Naylor & Neal ABSTRACT: A cutting tool having a blade and a hollow handle into which the blade may be folded. The blade is formed into a beveled cutting tooth to be repetitively drawn across hard sheet material, such as plastic, to cut the same to a depth sufficient to allow clean breakage of the material along the cut line.

PATENTED AUG 31 1971 3,601,893

INVENTOR.
LYLE N. KNOX
BY Naylor & Neal
ATTORNEYS

CUTTING TOOL FOR SHEET MATERIAL

BACKGROUND OF THE INVENTION

The present invention relates to a hand tool adapted for cutting sheet materials, such as laminated plastics, decorative plastics, tile board, compressed tempered hardboard, printed circuit boards, and so forth.

Common hand tools, such as saws, ordinary knives and razor blades, are unsuitable for the cutting of such sheet materials because they leave irregular edges and are difficult to manipulate. Specially, the use of a razor blade in a holder is unsatisfactory because soft material offers great resistance to the pulling of the blade through it and hard material quickly dulls the blade, necessitating frequent resharpening or replacement.

Furthermore, deep cuts are difficult to make. Repetitive passes of such blades over the same cut line are necessary and this frequently results in the blade deviating from the original cut line. Also, the thin, brittle razor blades tend to break in such operations.

The alternatives are to use a power saw with a blade especially designed to cut the specific material being handled, or to use a heavy shear for the harder materials. THese alternatives are inherently more expensive and less convenient than the use of a hand cutting tool.

MOre recently, hand cutting tools adapted for use with a variety of sheet building materials have been developed. Typical of these is the tool described in U.S. Pat. No. 3,355,804. All are relatively expensive to produce and have blades which are permanently exposed.

SUMMARY OF THE INVENTION

The present invention relates to the latter genera of scribing hand tools, but is distinguished by a blade which can be simply resharpened with the use of a common flat stone or file, an overall construction which significantly lowers the cost of production, and an improved handle which sheathes the blade when it is not in use.

The blade is fashioned from spring steel, or the like, of a uniform thickness. At the end remote from the handle, a beveled straight edge is inclined to the longitudinal axis of the blade. A square-cut straight edge intersects the beveled edge at an acute angle to form the cutting tooth. Because only the square-cut straight edge of the cutting tooth is worn by continued use, the blade may easily be restored to its original sharpness by dressing this edge with a flat stone or file.

DESCRIPTION OF THE ILLUSTRATED EMBODIMENT

Figure 1:
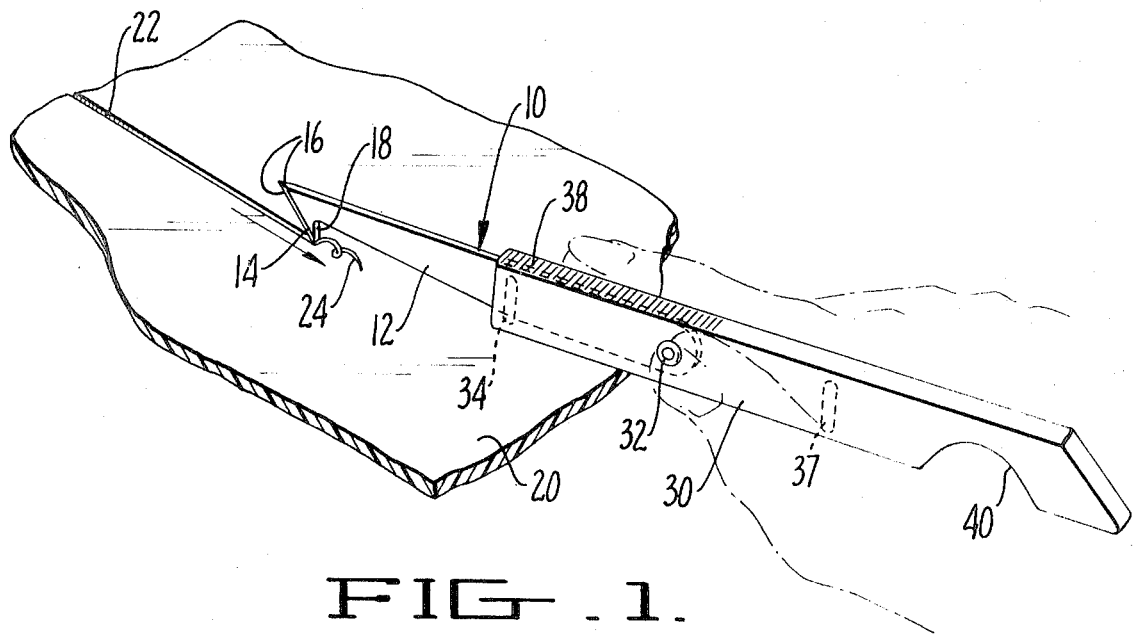
FIG. 1 is a perspective view of the tool being drawn across sheet material.
Figure 2:
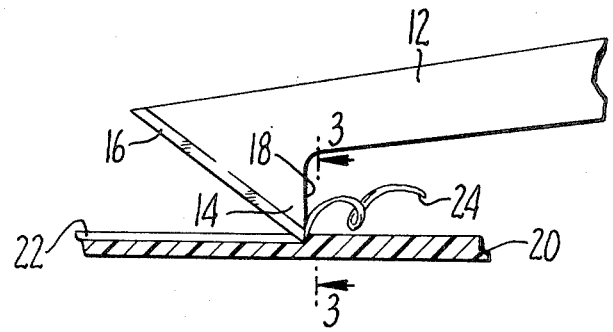
FIG. 2 is a detail view in elevation showing the cutting action of the blade, the sheet material being shown in cross section along the path of the cut line.

Referring to the drawing in detail, the tool 10 includes a metal blade 12 of uniform thickness. The blade is fabricated of spring steel, for example, approximately 0.032inch thickness. At one end of the blade 12, a cutting tooth 14 is formed by the intersection of a doubly beveled straight edge 16 and a square-cut straight edge 18.

The tooth further comprises handle 30 which is preferably formed of molded plastic. The blade 12 extends within the hollow interior of handle 30 and is pivotally pinned thereto at a distance from the end of the handle by a rivet 32. The portion of the handle 30 which extends over the blade 12 when the blade is in the open position gives the blade 12 substantial lateral support by means of the bearing surfaces 34. In addition, bearing surfaces 36 concentric to rivet 32 securely support the end of the blade. Bearing surfaces 34 and 36 inhibit lateral wobble of the blade during a cutting operation. Further bearing surfaces 37 tend to retain the blade in its closed position. The handle is provided with knurling 38 to aid in the application of downward force to the tool by the index finger. An arcuate indentation 40 in the side walls of the handle provides a convenient finger grip when the tool 10 is in use, as well as enabling the blade to be gripped for pivotal movement.

OPERATION

Figure 3:
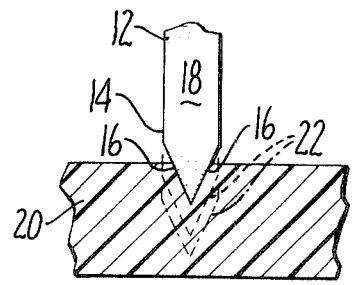
FIG. 3 is a detail view in section of the blade and material being cut, the depth of successive cuts in the material being shown in dotted outline.
Figure 5:
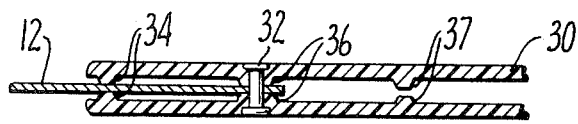
FIG. 5 is a sectional view taken along lines 5—5 of FIG. 4.
Figure 4:
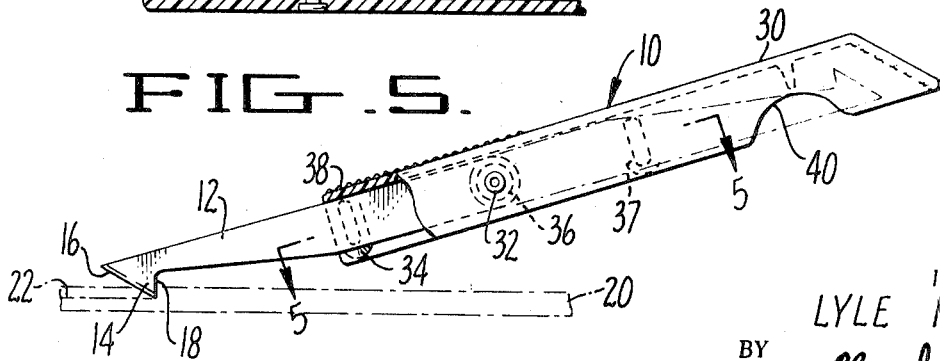
FIG. 4 is a view in elevation of the tool of the invention.

The tool 10 is used as by positioning a straight edge, not shown, in the desired position over the material 20 to be cut. The tool is drawn handle first over the material 20, the straight edge 18 of the cutting tooth 14 being held substantially perpendicular to the material 20. The resultant cutting action removes a portion of the material 20 in the form of a continuous chip or curl 24 to form cut 22. By repeated manipulation of the tool in this manner, the depth of the cut is incrementally increased, as shown in FIG. 3, until the material is cut to a sufficient depth to permit its clean breakage along the cut line by hand.

It is to be pointed out that the cutting means formed on the tool consists of the V-shaped lower extremity of tooth edge 18. As the sharpness of the apex of this V-shape becomes blunted from time to time due to wear the edge 18 is moved inwardly in parallel to its original position by a simple grinding operation, and thus, through repeated sharpenings of the tool, the length of tooth edge 18 becomes progressively decreased.

What is Claimed is:

1. A tool adapted for the cutting of sheet material comprising an elongated flat blade having a forward end and a rearward end, said blade having at its forward end a rearwardly and outwardly directed V-beveled straight edge, disposed at an acute angle with respect to the longitudinal axis of the blade, said blade having a cutting tooth defined by the intersection at an acute angle of said beveled edge with an inwardly directed edge, said cutting tooth being adapted, upon being worn, to be restored to its original conditions of form and sharpness by filing or grinding said inwardly directed edge to relocate the same forwardly of and parallel to its original position, said blade having but one such tooth and thereby having an asymmetrical forward end provided with said tooth.

2. The tool of claim 1 further comprising a hollow handle pivotally secured to the rearward end of said blade and adapted to receive the blade therein in folded condition, said handle having a forward portion adapted to enclose a substantial portion of the length of said blade and to reinforceably position said blade in unfolded condition.

3. A tool adapted for the cutting of sheet material comprising a flat blade having a forward end and a rearward end, a first linear edge terminating at said forward end and defining at least a portion of one side edge of the blade, a second linear edge defining at least a portion of the other side edge of the blade, said second edge terminating short of said forward end, said first and second edges being angularly inclined toward each other in the direction of said forward end at a first included acute angle, said blade having a third linear edge which is V-beveled and directed rearwardly and outwardly from said first edge and said forward end at a second included acute angle, said second angle being substantially greater than said first angle, a fourth linear edge extending between the outer end of said third edge and the inner end of said second edge and defining with said third edge a cutting tooth having a third included acute angle, and a handle attached to the rearward end of said blade and shaped so that said tooth may be pulled essentially horizontally across horizontally disposed sheet material to be cut thereby.